(12) United States Patent
Lin et al.

(10) Patent No.: US 8,370,279 B1
(45) Date of Patent: Feb. 5, 2013

(54) NORMALIZATION OF PREDICTIVE MODEL SCORES

(75) Inventors: Wei-Hao Lin, New York, NY (US);
Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,474

(22) Filed: Sep. 29, 2011

(51) Int. Cl.
*G06F 15/18* (2006.01)

(52) U.S. Cl. ............................................... 706/12

(58) Field of Classification Search ................ None
See application file for complete search history.

(56) References Cited

U.S. PATENT DOCUMENTS

| | | | | |
|---|---|---|---|---|
| 5,271,088 A * | 12/1993 | Bahler | ........................... | 704/200 |
| 6,243,696 B1 | 6/2001 | Keeler et al. | | |
| 6,778,959 B1 * | 8/2004 | Wu et al. | ....................... | 704/256 |
| 6,879,971 B1 | 4/2005 | Keeler et al. | | |
| 7,010,696 B1 | 3/2006 | Cambridge et al. | | |
| 7,054,847 B2 | 5/2006 | Hartman et al. | | |
| 7,194,395 B2 * | 3/2007 | Genovese | ........................... | 703/6 |
| 7,349,919 B2 | 3/2008 | Russell et al. | | |
| 7,565,304 B2 | 7/2009 | Casati et al. | | |
| 7,590,589 B2 | 9/2009 | Hoffberg | | |
| 7,606,924 B2 | 10/2009 | Raz et al. | | |
| 7,650,331 B1 | 1/2010 | Dean et al. | | |
| 7,668,740 B1 | 2/2010 | Baggett et al. | | |
| 7,689,520 B2 | 3/2010 | Burges et al. | | |
| 7,788,195 B1 | 8/2010 | Subramanian et al. | | |
| 7,813,870 B2 | 10/2010 | Downs et al. | | |
| 7,813,944 B1 * | 10/2010 | Luk et al. | .......................... | 705/4 |
| 7,899,611 B2 | 3/2011 | Downs et al. | | |
| 7,912,628 B2 | 3/2011 | Chapman et al. | | |
| 7,930,266 B2 | 4/2011 | Tuv et al. | | |
| 7,970,721 B2 | 6/2011 | Leskovec et al. | | |
| 7,979,365 B2 | 7/2011 | Goldberg et al. | | |
| 8,027,854 B2 | 9/2011 | Baggett et al. | | |
| 8,065,073 B2 | 11/2011 | Downs et al. | | |
| 8,065,659 B1 | 11/2011 | Prince et al. | | |
| 8,090,524 B2 | 1/2012 | Chapman et al. | | |
| 2002/0099730 A1 | 7/2002 | Brown et al. | | |
| 2003/0212851 A1 | 11/2003 | Drescher et al. | | |

(Continued)

OTHER PUBLICATIONS

Altincay, Hakan et al.; "Post-processing of Classifier Outputs in Multiple Classifier Systems"; 2002; Springer-Verlag Berlin Hedidelberg; Lecture Notes in Computer Science, 2002, vol. 2364; pp. 159-168.*

(Continued)

*Primary Examiner* — David R Vincent
*Assistant Examiner* — Stanley K Hill
(74) *Attorney, Agent, or Firm* — Fish & Richardson P.C.

(57) ABSTRACT

Methods, systems, and apparatus, including computer programs encoded on computer storage media, for score normalization. One of the methods includes receiving initial training data, the initial training data comprising initial training records, each initial training record identifying input data as input and a category as output. The method includes generating a first trained predictive model using the initial training data and a training function. The method includes generating intermediate training records by inputting input data of the initial training records to a second trained predictive model, the second trained predictive model generated using the training function, each intermediate training record having a score. The method also includes generating a score normalization model using a score normalization training function and the intermediate training records.

27 Claims, 8 Drawing Sheets

U.S. PATENT DOCUMENTS

| | | |
|---|---|---|
| 2005/0234753 A1 | 10/2005 | Pinto et al. |
| 2007/0150424 A1 | 6/2007 | Igelnik |
| 2008/0097937 A1 | 4/2008 | Hadjarian |
| 2008/0270363 A1 | 10/2008 | Hunt et al. |
| 2008/0288209 A1 | 11/2008 | Hunt et al. |
| 2008/0288889 A1 | 11/2008 | Hunt et al. |
| 2008/0294372 A1 | 11/2008 | Hunt et al. |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0018996 A1 | 1/2009 | Hunt et al. |
| 2009/0106178 A1 | 4/2009 | Chu |
| 2010/0049538 A1 | 2/2010 | Frazer et al. |
| 2011/0145175 A1 | 6/2011 | Agarwal |
| 2011/0289025 A1 | 11/2011 | Yan et al. |

OTHER PUBLICATIONS

Altincay, Hakan et al.; "Why does output normalization create problems in multiple classifier systems?"; 2002; IEEE; 16th International Conference on Pattern Recognition, Proceedings—vol. 2; pp. 775-778.*

Stemmer, Georg et al.; "Comparison and Combination of Confidence Measures"; 2006; Springer-Verlag Berlin Heidelberg; Lecture Notes in Computer Science 2006, vol. 2448; pp. 181-188.*

Altincay, Hakan et al.; "Undesirable effects of output normalization in multiple classifier systems"; 2002; Elsevier Science B.V.; Pattern Recognition letters 24 (2003); pp. 1163-1170.*

Delany, Sarah Jane et al.; "Generating Estimates of Classification Confidence for a Case-Based Spam Filter"; 2005; Springer-Vergal Berlin Heidelberg; Lecture Notes in Computer Science, 2005, vol. 3620; pp. 177-190.*

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

Chandra, Tushar, "Sibyl: a system for large scale machine learning" Keynote I PowerPoint presentation, Jul. 28, 2010, ladisworkshop.org [online] [Retrieved on Jan. 25, 2011]. Retrieved from the Internet: <URL: http://ladisworkshop.org/sites/default/files/LADIS%202010%20actual.pdf>, 43 pages.

Duchi, John, et al., "Boosting with Structural Sparsity", 2009, cs.berkeley.edu [online] [Retrieved on Jan. 25, 2011]. Retrieved from the Internet: <URL: http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online] [Retrieved on Jan. 25, 2011]. Retrieved from the Internet: <URL: http://www.cs.berkeley.edu/~jduchi/projects/DuchiSi09a.pdf>, 8 pages.

R-Project web pages, 190 pages [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com>, 16 pages.

Zementis web pages [online] [Retrieved on May 18, 2010]. Retrieved from the Internet: <URL: http://www.zementis.com>, 34 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, vol. 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter'; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

Creative Commons Attribution-Share Alike 3.0 Unported, Cross-validation (statistics)., May 28, 2011, retrieved from: http://en.wikipedia.org/w/index.php?title=Cross-validation_(statistics)&oldid=431307466; pp. 1-5.

Creative Commons Attribution-Share Alike 3.0 Unported, Winnow (algorithm)., May 29, 2011, retrieved from http://en.wikipedia.org/w/index.php?title=Winnow_(algorithm)&oldid=431561845, 2 pages.

Bengio, Yoshua, Continuous Optimization of Hyper-Parameters, C.P. 6128 Succ. Centre-Ville, Montreal, Quebec, Canada, H3C 3J7, Aug. 6, 2002, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, Nov. 24, 2003, 12 pages.

\* cited by examiner

NORMALIZATION OF PREDICTIVE MODEL SCORES

TECHNICAL FIELD

This specification relates to predictive analysis.

BACKGROUND

Predictive analytics generally refers to techniques for extracting information from data to build a model that can predict an output from a given input. Predicting an output can include predicting future trends or behavior patterns or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively.

SUMMARY

This document describes techniques for score normalization.

In general, one innovative aspect of the subject matter described in this specification can be embodied in methods that include the actions of receiving initial training data, the initial training data comprising initial training records, each initial training record identifying input data as input and a category as output. The methods also include the actions of generating a first trained predictive model using the initial training data and a training function. The methods also include the actions of generating intermediate training records by inputting input data of the initial training records to a second trained predictive model, the second trained predictive model generated using the training function, each intermediate training record having a score. The methods also include the actions of generating a score normalization model using a score normalization training function and the intermediate training records.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination generating intermediate training records may include dividing the initial training records into sets of training records, the sets of training records including a first set of training records, generating the second trained predictive model using at least one of the sets of training records, and generating an intermediate training record for each initial training record in the first set of training records, each intermediate training record having a value as input and the category of a respective initial training record as output, wherein the value is generated by inputting input data of the respective initial training record into the second trained predictive model. Generating the second trained predictive model may include generating the second trained predictive model using all of the plurality of sets of training records except the first set of training records. The methods may also include the actions of calculating a mean of the scores of the intermediate training records, and for each intermediate training record, reducing the score of the intermediate training record by the mean. The methods may also include the actions of determining a high-end score for the scores of the intermediate training records, identifying an intermediate training record having a score greater than the high-end score, and changing the score of the identified intermediate training record to be the high-end score. The methods may also include the actions of determining a low-end value for the scores of the intermediate training records, identifying a second intermediate training record having a score less than the low-end score, and changing the score of the identifier second intermediate training record to be the low-end score. The score normalization model may be configured to generate scores associated with predictive outputs wherein the scores are between zero and one, inclusive. The methods may also include the actions of receiving a predictive request from a client device, the predictive request including input data, generating an intermediate output by inputting the input data to the first trained predictive model, generating a predictive output by providing the intermediate output to the score normalization model, and providing the predictive output to the client device. Each of the intermediate training records may include a value for each distinct category in the initial training data.

Particular embodiments of the subject matter described in this specification can be implemented so as to realize one or more of the following benefits. Predictive models can be retained and replaced with new predictive models utilizing different training functions while maintain a consistent client experience. Predictive models can be replaced with better performing predictive models.

DESCRIPTION OF DRAWINGS

Like reference symbols in the various drawings indicate like elements.

DETAILED DESCRIPTION

Generally, predictive models accept one or more inputs and produce a corresponding output and a score. The predictive models are generated using a training function and a set of training data. Predictive models can be trained using a variety of different training functions. Different training functions can produce predictive models that generate different prediction scores for the same queries. For example, changing the training function for a predictive model can result in sudden change in scores. For example, a predictive model trained with one training function may produce scores between 0 and 50, while a predictive model trained with a different training function may produce scores between −100 and 1000.

To provide a consistent output to users of the predictive models, a second predictive model can be used to normalize the scores. For example, scores can be normalized to produce values between zero and one, inclusive.

Figure 1:
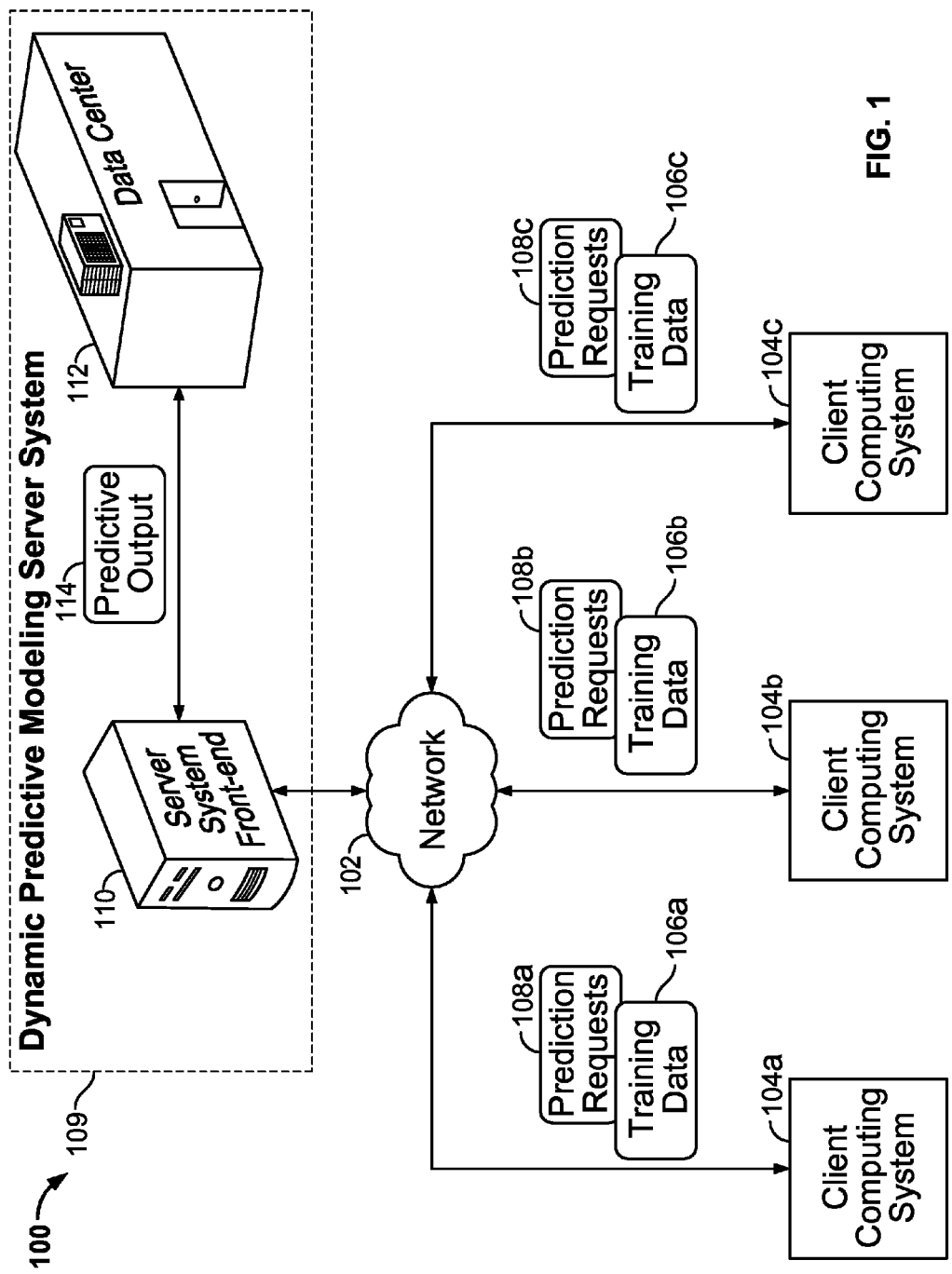
FIG. 1 is a schematic representation of an example system that provides a predictive analytic platform.

FIG. 1 is a schematic representation of an example system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
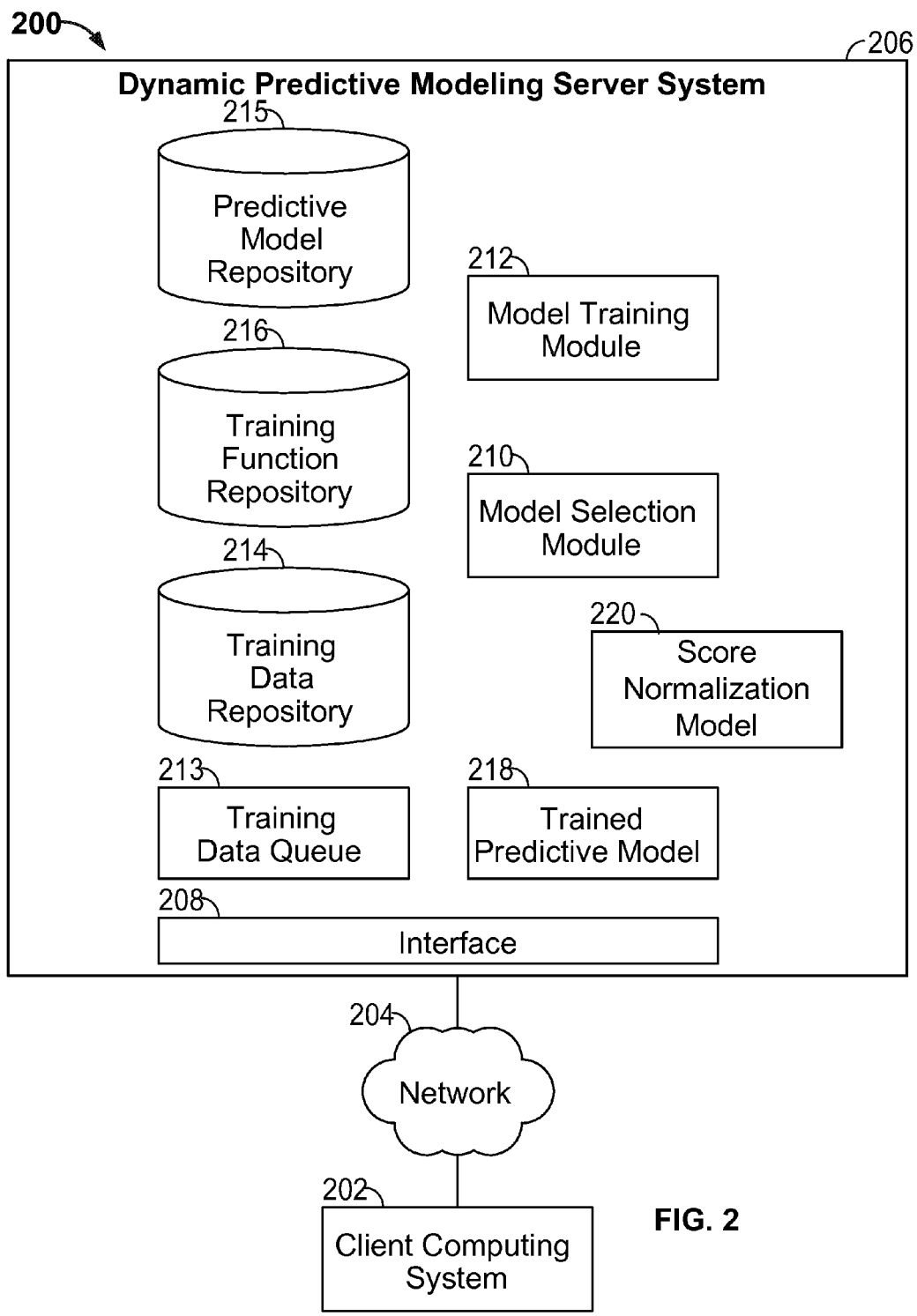
FIG. 2 is a schematic block diagram showing an example system for providing a dynamic predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the predictive model repository 215.

Figure 3:
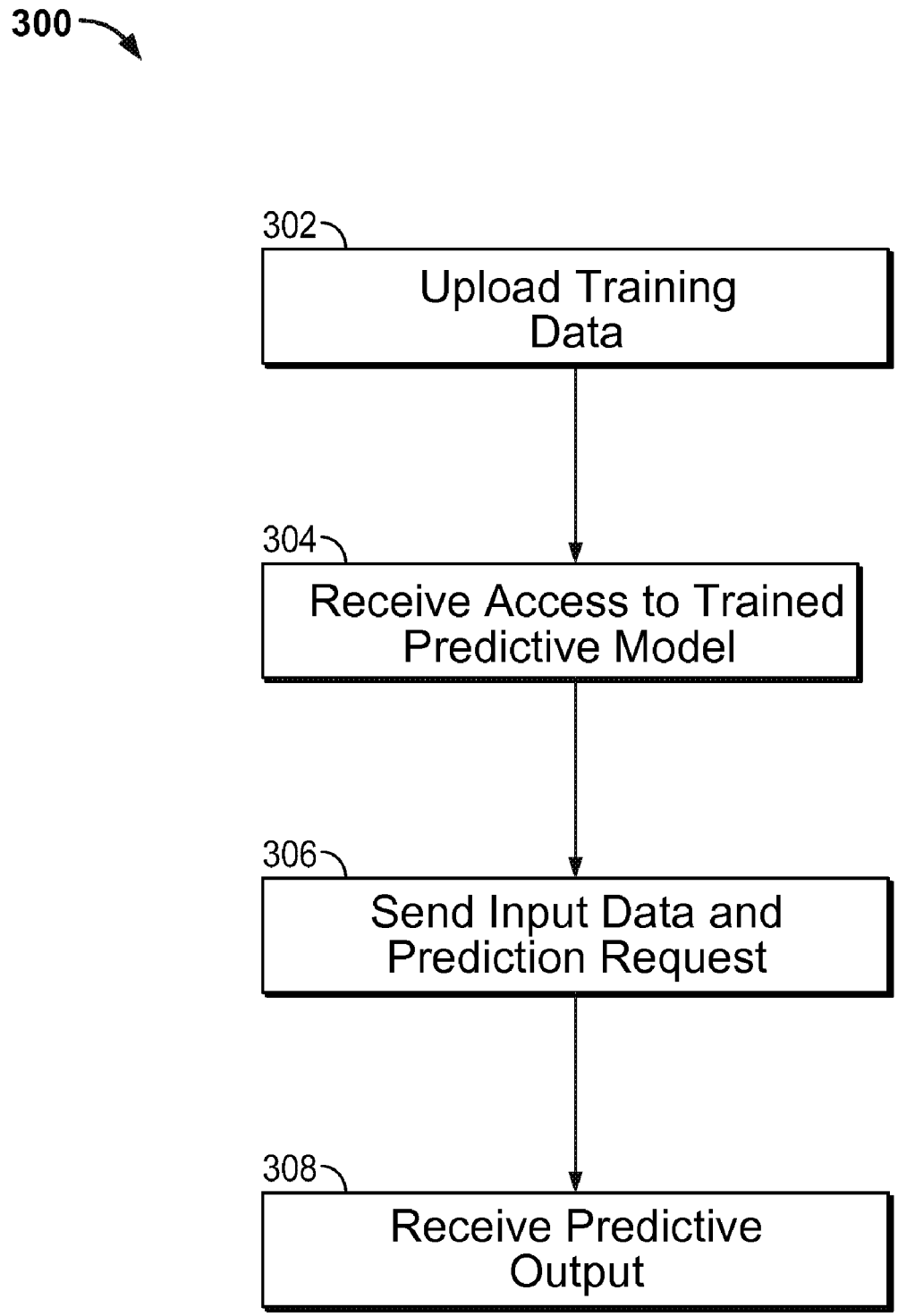
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 can be carried out by the client computing system 202 when the corresponding client entity is uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308). In general, the predictive output can include one or more categories and a corresponding score for each category. The scores being representative of confidence that the category is appropriate for the input data. As discussed below, the scale of the score can vary depending on the training function used to generate the predictive model. For example, one predictive model may produce scores from −100 to 100 while a different predictive model generates scores from 0 to 50.

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

Figure 4:
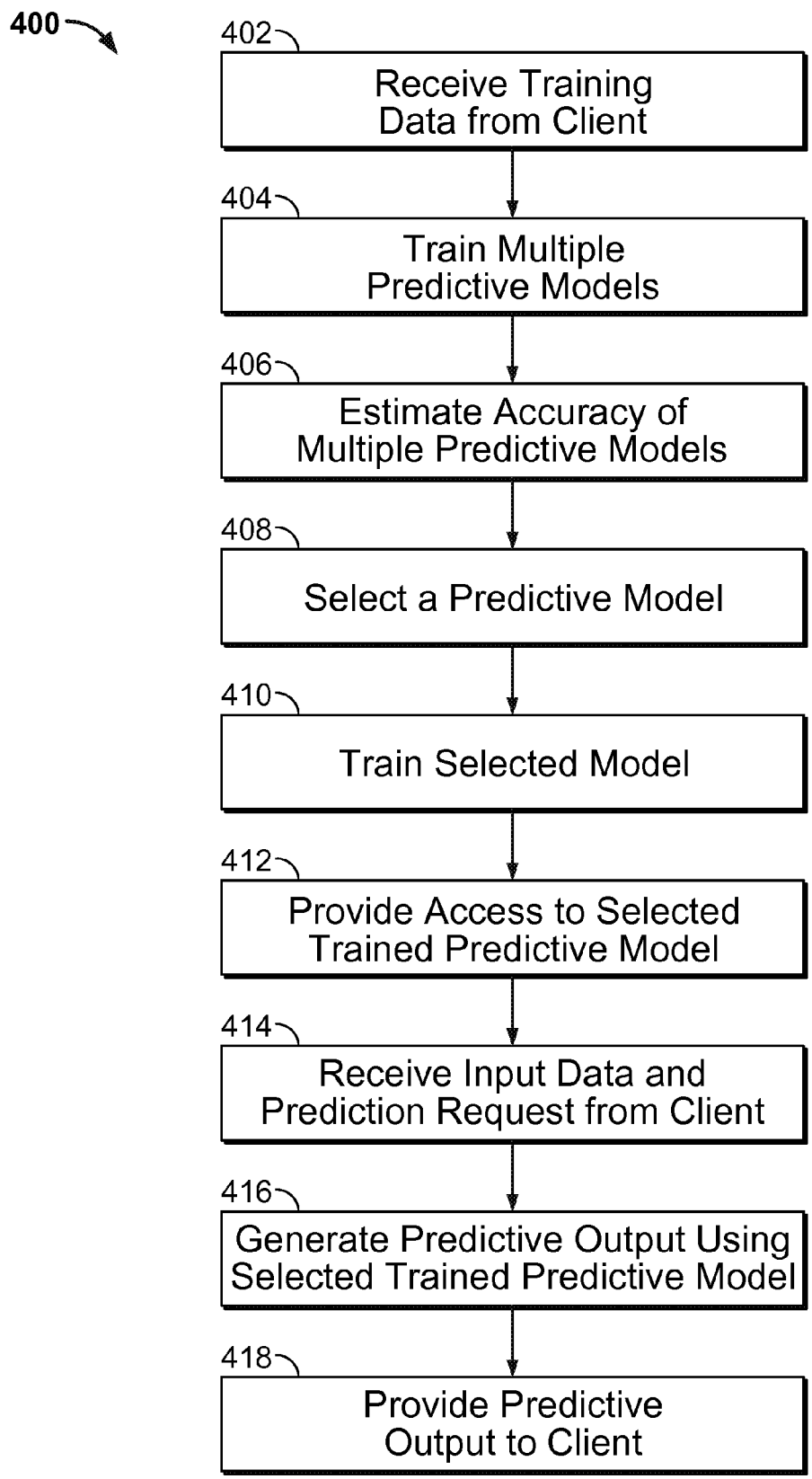
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data.

Referring to FIG. 4, training data (i.e., initial training data) is received from the client computing system (Step 402). For example, the client computing system 202 can upload the training data to the predictive modeling server system 206 over the network 204 either incrementally or in bulk (i.e., as batch). As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired category. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an Hypertext Transfer Protocol (HTTP) web service. The client computing system 202 can access storage objects using a RESTful API to upload and to store their training data on the predictive modeling server system 206. The predictive modeling server system 206 can provide utility software that can be used by the client computing system 202 to upload the data. In some implementations, the predictive modeling server system 206 can be made accessible from many platforms, including platforms affiliated with the predictive modeling server system 206, and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

When new training data is received for an existing predictive model a new predictive models may be trained. The new predictive model may be trained using a different training function than was used to train the existing predictive model. Consequently, the predictive output generated by the new predictive model may vary from the predictive output generated from the existing predictive model, for example, scores associated with a predictive output may be on a different scale.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entropy (MaxEnt) Analogue, Gradient based (FOBOS) and AdaBoost with Mixed Norm Regularization. The training function repository 216 can include one or more of these example training functions.

Referring again to FIG. 4, multiple predictive models, which can be all or a subset of the available predictive models, are trained using some or all of the training data (Step 404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a Uniform Resource Locator (URL). A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict a predictive output, different trained predictive models perform differently. That is, some can be more effective than others.

The effectiveness of each of the trained predictive models is estimated (Step 406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

As discussed above, when a predictive model is retrained, a new predictive model may be generated using a different training function. As a result, scores associated with predictive outputs generated by the new predictive model may be of a different scale that the scores generated by the previous predictive model. A score normalization model 220 can be trained to normalize scores provided by the trained predictive model 218. The score normalization model 220 is generated using the training data and predictive models trained using the training function of the trained predictive model 218, as described below.

Of the multiple trained predictive models that were trained as described above, some or all of them can be stored in the predictive model repository 215. Each trained predictive model can be associated with its respective effectiveness score. One or more of the trained predictive models in the repository 215 are updateable predictive models. In some implementations, the predictive models stored in the repository 215 are trained using the entire initial training data, i.e., all K partitions and not just K–1 partitions. In other implementations, the trained predictive models that were generated in the evaluation phase using K–1 partitions are stored in the repository 215, so as to avoid expending additional resources to re-compute the trained predictive models using all K partitions.

Access to the trained predictive model is provided (Step 412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 414).

In response, the input data is input to the trained predictive model 218 and a predictive output generated by the trained model (Step 416). The predictive output can include a score. In some implementations, the score of the predictive output can be provided to score normalization model 220. The score normalization model 220 can provide an updated score within a predetermined range (for example, between zero and one, inclusive.) The predictive output is provided; it can be provided to the client computing system (Step 418).

In some implementations, where the client computing system is provided with a URL to access the trained predictive model, input data and a request to the URL can be embedded in a Hypertext Markup Language (HTML) document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

Generated predictive outputs can include one or more categories and a corresponding score for each category. A score may be, for example, a measure of confidence that the category is an appropriate response for the predictive request. Predictive models using different training functions product different predictive models that provide a variety of different scores, even when trained using the same training data. For example, a predictive request provided to a predictive model generated using one training function may produce scores between 0 and 50. Another trained predictive model, generated using a different training function, may produce scores between −100 and 1000. Because a dynamic predictive modeling server system can retrain predictive models using different training functions, client computing systems can suddenly receive score that are inconsistent with previously received predictive outputs.

A second trained predictive model, called a score normalization model, can be used to normalize the scores and deliver a consistent experience.

Figure 5:
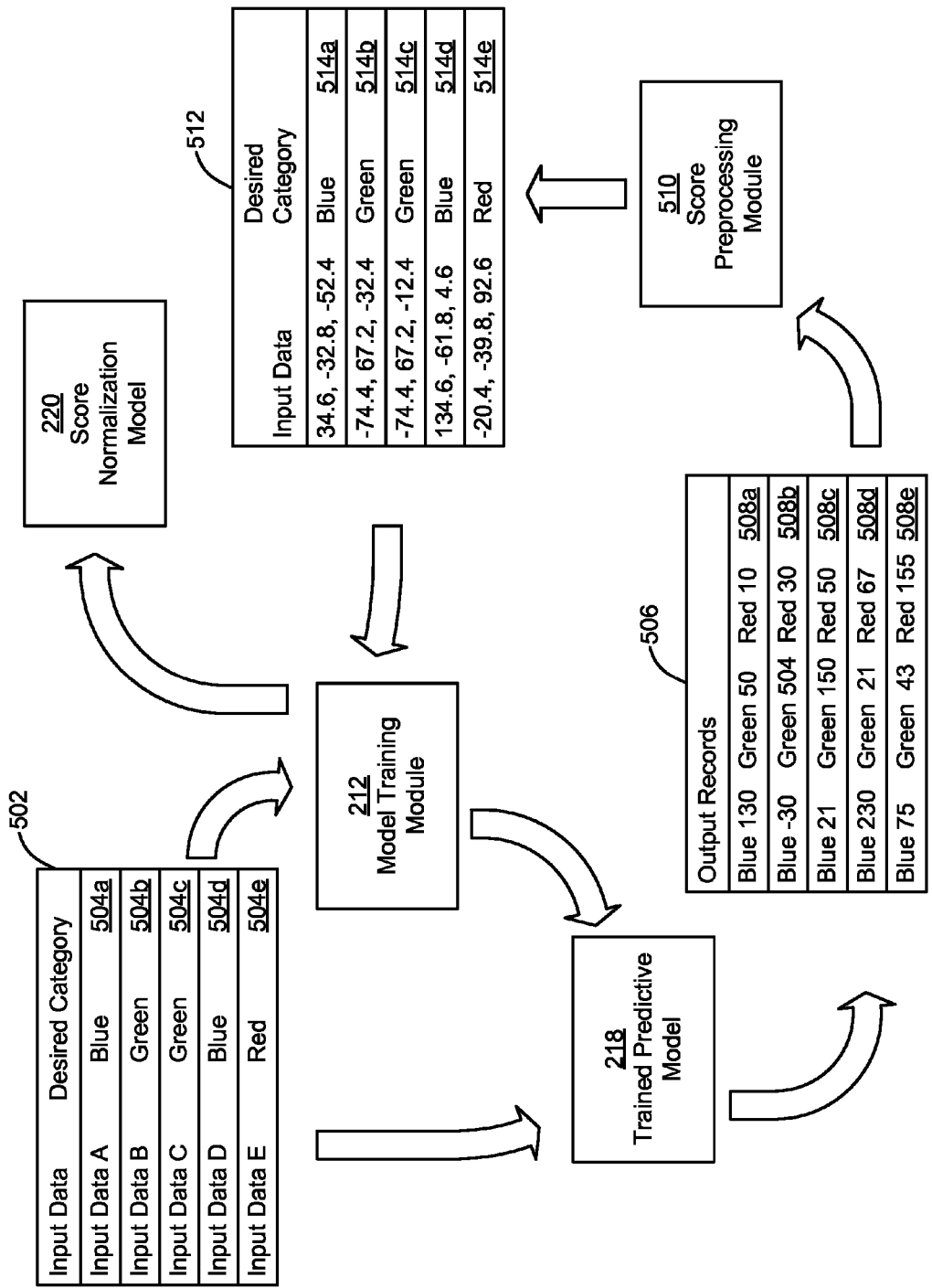
FIG. 5 illustrates a system generating a score normalization model.

FIG. 5 illustrates generating a score normalization model. The predictive model server system 206 receives training records 502. The training records 502 include input data as input and a desired category as output. For example, training record 504*a* includes "Input Data A" as input and "Blue" as output, training record 504*b* includes "Input Data B" as input and "Green" as output, training record 504*c* includes "Input Data C" as input and "Green" as output, training record 504*d* includes "Input Data D" as input and "Blue" as output, and training record 504*e* includes "Input Data E" as input and "Red" as output. As discussed above, a data necessary to train a predictive model can be more than a gigabyte in size. Five records are shown in FIG. 5 for simplicity.

The training records 502 are provided to a model training module 212. As discussed above, the model training module generates a trained predictive model 218. The training records 502 are inputted into the trained predictive model 218 to generate output records 506. In some implementations, as discussed below, each training record is inputted into a trained predictive model that was trained using a subset of the training data 502 that does not include the training record. Each of the output records 506 includes one or more categories and a score for each category. For example, training record 504*a* provided to the trained predictive model generates output record 508*a*. Output record 508 identifies "Blue," "Green," and "Red" categories and provides a score for each, 130, 50, and 10 respectively. Similarly, training records 504*b-e* inputted to the trained predictive model 218 results in output records 508*b-e*, respectively. In some implementations, each of the output records includes each of the possible categories and a score that represents a measure of confidence that the category applies to the inputted training record.

The output records 506 can be stored, for example, in a relational data base table (not shown).

The score preprocessing module 510 generates score training records 512 using the output records 506. The score training records include as input modified scores for each category in the output records 506 and the category from the original input records 502.

The output records 506 are processed by the score preprocessing module 510. The score preprocessing module 510 analyzes the scores of the output records 506. In some implementations, the score preprocessing module 510 identifies outlying records. For example, the score preprocessing module 510 can determine a high-score value and a low-score value. The high-score value can be defined such that five percent of the output records have scores that exceed the high-score value. The low-score value can be defined such that five percent of the output records have scores that are lower than the low-score value. The high-score value and the low-score value can also be determined using other means. For example, the high-score value and the low-score value may be determined to be one, two, or three standard deviations from the mean score. In some implementations, output records 506 with scores above the high-score value or below the low-score value can have their score changed to the high score value or low-score value respectively. In other implementations, output records with scores above the high-score value or below the low-score value are discarded. The high-score value and low-score value can be determined separately for scores associated with each category. In other implementations, a separate single high-score value and a single low-score value is determined for each category.

In this example, assuming the score preprocessing module 510 identifies a low score value of 21 for the "Blue" category. The score associated with the "Blue" category of output record 508b is changed from −30 to 21. Similarly, assuming the score preprocessing module identifies a high-score value of 150 for the scores associated with the "Green" category, the score preprocessing module changes the score associated with the "Green" category of output record 508b from 504 to 150.

The score preprocessing module 510 can determine a mean value for the scores of the output records 506 for each category. The score of each output record can be reduced by the corresponding mean. By reducing the scores by the mean value, the scores of the output records are distributed around zero. In this example, the score preprocessing module calculates a mean value of 95.4 for scores associated with the "Blue" category, a mean value of 82.8 for scores associated with the "Green" category, and a mean value of 62.4 for scores associated with the "Red" category.

The score preprocessing module 510 subtracts the mean value of for each category from the respective scores. As a result the scores corresponding to output record 508a become 34.6 for "Blue" (i.e., 130-95.4), −32.8 for "Green" (i.e., 50-62.4) and −52.4 for "Red" (i.e., 10-62.4). These scores are provided as input data to the score training record 514a. The process is repeated for each of output records 508b-e, generating score training records 514b-e.

The score preprocessing module 510 can store the mean value, high-score value, and low-score value for each category in a data store (not shown) for later use. The mean values, high-score values, and low-score values are associated with the trained predictive model 504. Different trained predictive models have different mean values, high-score values, and low-score values.

In some implementations, the score training record includes a numerical representation of the category of the original input record. For example, the score preprocessing module 510 may determine that "Blue" corresponds to "1," "Green" corresponds to "2" and "Red" corresponds to "3."

The score training data 512 is provided to the module training module 212. The model training module generates a score normalization model 220. In some implementations, the model training module 212 uses a logistic regression training function to train the score normalization model 220. The logistic regression training function maps the scores provided in the preprocessed output records to a score between zero and one, inclusive.

Figure 6:
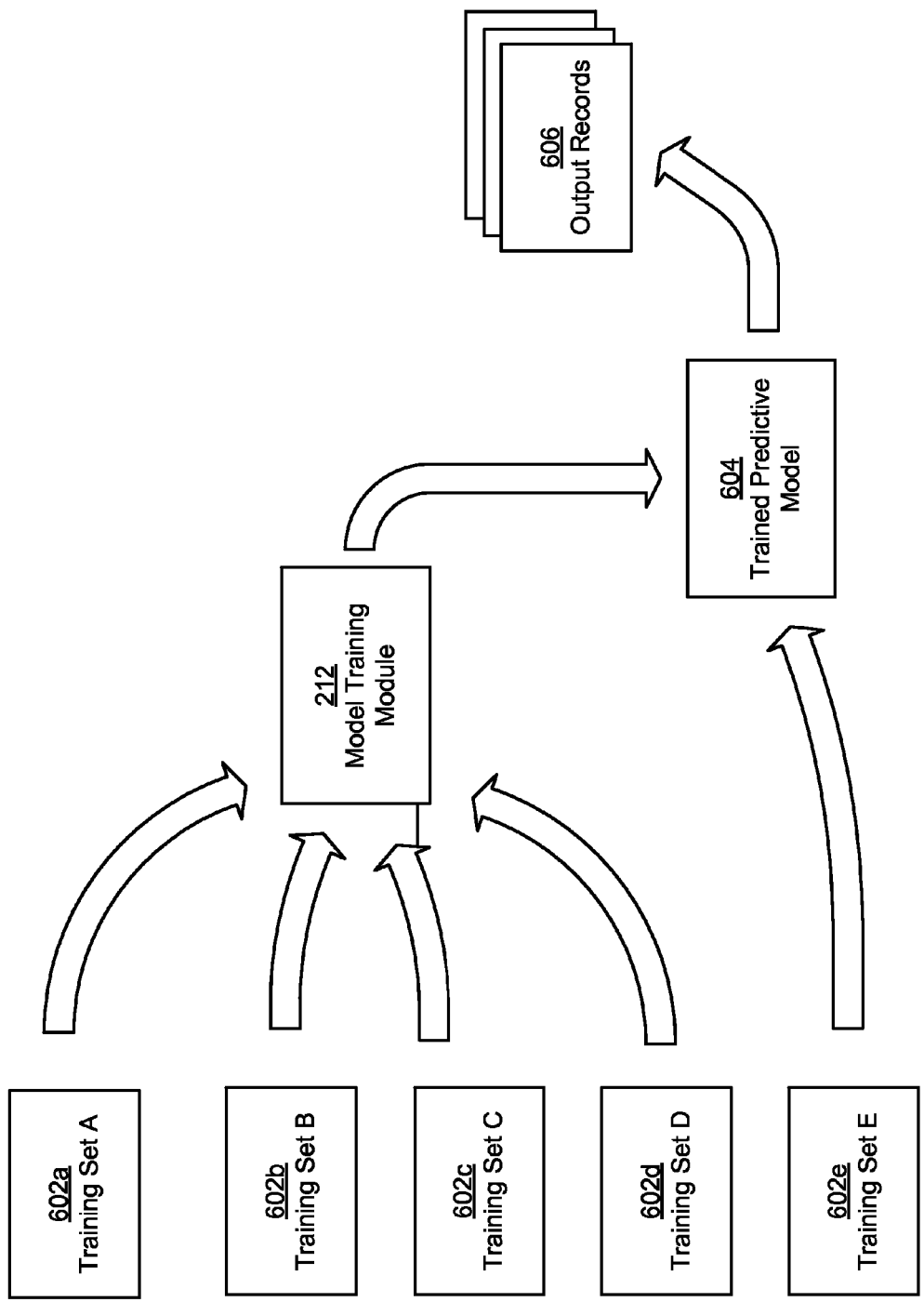
FIG. 6 illustrates generating output data to train a score normalization model.

FIG. 6 illustrates generating output data to train a score normalization model. The score normalization model is trained for use with a training function.

The training records can be divided into multiple sets of training records. In this example the training records are divided into Training Set A 602a, Training Set B 602b, Training Set C 602c, Training Set D 602d, and Training Set E 602e. In some implementations, the training records are divided into five sets, with each set comprising approximately twenty percent of the training records. In scenarios in which the training records cannot be evenly divided, extra training records can be distributed among the training sets.

Some of the training sets are provided to the model training module 212. The model training module 212 generates a trained predictive model 604 using the provided training sets. In some implementations, all of the training sets except one are used to generate the trained predictive model 604. For example, eighty percent of the records may be used to generate the trained predictive model 604.

The remaining training set, in this example Training Set E 602e is inputted into the trained predictive model 604. The trained predictive model 604 outputs training records 606.

In order to create a complete set of training records, the process may be repeated so that all of the training sets are provided as input to a trained predictive model generated using the remaining training sets. For example, training set A 602a, training set B 602b, training set C 602c, training set E 602e can be used to generate a trained predictive model using the training function. Training set D 602d can be provided to the trained predictive model to generate another set of output records, etc.

The output records generated from each training set can be combined into a set of output records for use in training the model training module.

Figure 7:
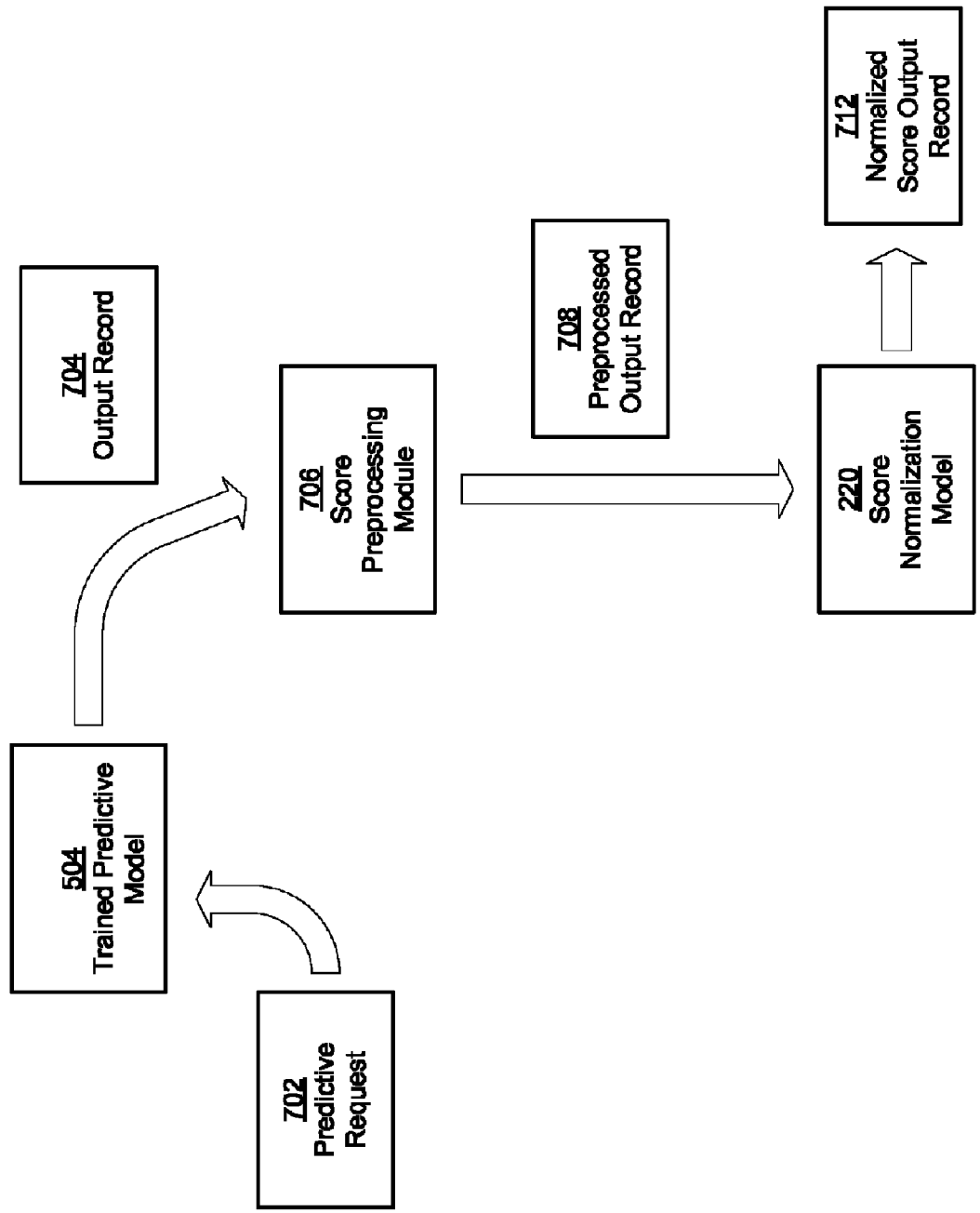
FIG. 7 illustrates providing an output in response to a predictive request.

FIG. 7 illustrates providing an output in response to a predictive request 702. The predictive request 702 can be received from a client device.

The trained predictive model 504 receives the predictive request 704. The trained predictive model generates an output record 704 based on the predictive request 702. As discussed above, the output record includes categories and a score for each category.

In this example, a score preprocessing module 706 receives the output record 704. The score preprocessing module obtains the mean value, the high-score value, and the low-score value for each category from a data store (not shown). If the score of the output record 704 for any category exceeds the high-score value for that category then the score preprocessing module 706 changes the score of the output record 704 to the high-score value. If the score of the output record 704 for any category is less than the low-score value for that category then the score preprocessing module 706 changes the score of the output record 704 to the corresponding low-score value. The score preprocessing module subtracts the mean value for each category from the score of the respective category.

The resulting preprocessed output record 708 is inputted into the score normalization model 220. The score normalization model generates a normalized score output record 712. The normalized score about record can be provided to the client device.

Figure 8:
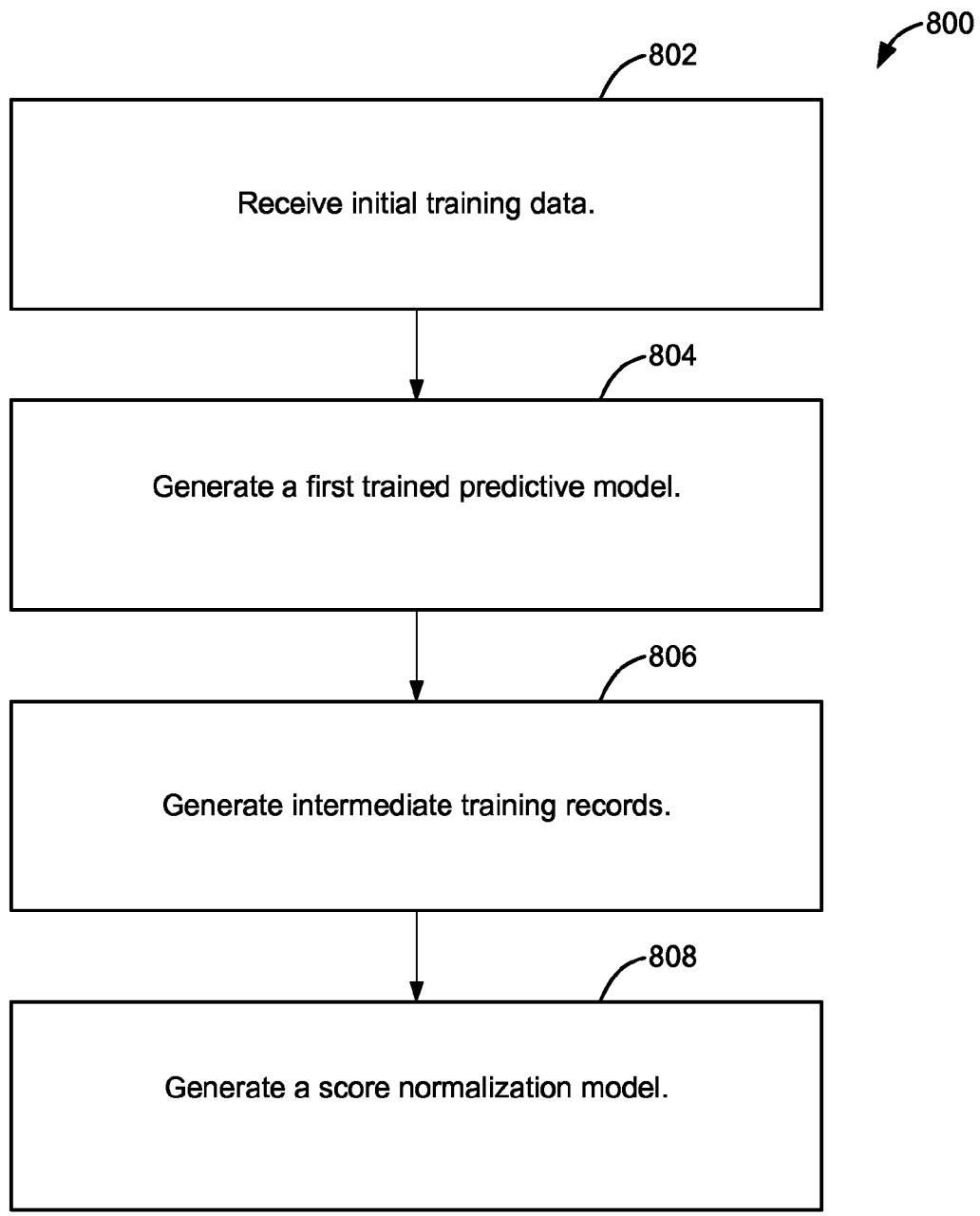
FIG. 8 illustrates an example of a process for score normalization.

FIG. 8 illustrates an example of a process 800 for score normalization. The process can be performed, for example, by the dynamic predictive modeling server 206 of FIG. 2. For convenience the process will be described in terms of a system performing the process.

The process 800 receives initial training data (802). The initial training data includes initial training records that identify input data as input and a category as output.

The process 800 generates (804) a first trained predictive model. The trained predictive model can be generated using the initial training data and a training function. For example, by the model training module 212 of FIG. 2 using the process described above with respect to FIG. 4.

The process 800 generates (806) intermediate training records. The intermediate records can be generated by inputting the input data of the initial training records to a second trained predictive model. The second trained predictive model can be generated using the same training function as the first trained predictive model. Each intermediate training record has a score associated with a category.

Intermediate training records can be generated by dividing the initial training records into sets of training records, the sets of training records including a first set of training records. In some implementations, the intermediate training records are divided into five sets of training records.

A trained predictive model can be trained using at least one of the sets of training records. In some implementations, four sets of training records are used to generate the trained predictive model. The fifth set of training records can be inputted into the trained predictive model to generate intermediate training records. The process can be repeated until an intermediate training record is generated for each of the initial training records. In some implementations, each intermediate training record can include a score for each distinct category identified by the initial training records.

The process 800 generates (808) a score normalization model. The score normalization model can be generated using a score normalization training function and the intermediate training records. In some implementations, the score normalization model may be a trained predictive model generated using the intermediate training records and the process described above with respect to FIG. 4.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method comprising:
receiving initial training data, the initial training data comprising initial training records, each initial training record identifying input data as input and a category as output;
generating a trained predictive model using a first subset of the initial training data and a training function;

generating intermediate training records including inputting input data of a second subset of the initial training records to the trained predictive model, each intermediate training record having a score; and generating a score normalization model using a score normalization training function and the intermediate training records.

2. The method of claim 1, further comprising:

dividing the initial training records into sets of training records, the sets of training records including a first set of training records;

generating a second trained predictive model using at least one of the sets of training records; and generating an intermediate training record for each initial training record in the first set of training records, each intermediate training record having a value as input and the category of a respective initial training record as output, wherein the value is generated by inputting input data of the respective initial training record into the second trained predictive model.

3. The method of claim 2, wherein generating the second trained predictive model comprises generating the second trained predictive model using all of the sets of training records except the first set of training records.

4. The method of claim 1, further comprising:

calculating a mean of the scores of the intermediate training records; and for each intermediate training record, reducing the score of the intermediate training record by the mean.

5. The method of claim 1, further comprising:

determining a high-end score for the scores of the intermediate training records;

identifying an intermediate training record having a score greater than the high-end score; and changing the score of the identified intermediate training record to be the high-end score.

6. The method of claim 5, further comprising:

determining a low-end value for the scores of the intermediate training records;

identifying a second intermediate training record having a score less than the low-end score; and changing the score of the identifier second intermediate training record to be the low-end score.

7. The method of claim 1 wherein the score normalization model is configured to generate scores associated with predictive outputs wherein the scores are between zero and one, inclusive.

8. The method of claim 1, further comprising:

receiving a predictive request from a client device, the predictive request including input data;

generating an intermediate output by inputting the input data to the trained predictive model;

generating a predictive output by providing the intermediate output to the score normalization model; and providing the predictive output to the client device.

9. The method of claim 1, wherein each of the intermediate training records comprises a value for each distinct category in the initial training data.

10. A computer storage medium encoded with computer program instructions that when executed by one or more computers cause the one or more computers to perform operations comprising:

receiving initial training data, the initial training data comprising initial training records, each initial training record identifying input data as input and a category as output;

generating a trained predictive model using the a first subset of initial training data and a training function;

generating intermediate training records including inputting input data of a second subset of the initial training records to the trained predictive model, each intermediate training record having a score; and generating a score normalization model using a score normalization training function and the intermediate training records.

11. The medium of claim 10, further comprising:

dividing the initial training records into sets of training records, the sets of training records including a first set of training records;

generating a second trained predictive model using at least one of the sets of training records; and generating an intermediate training record for each initial training record in the first set of training records, each intermediate training record having a value as input and the category of a respective initial training record as output, wherein the value is generated by inputting input data of the respective initial training record into the second trained predictive model.

12. The medium of claim 11, wherein generating the second trained predictive model comprises generating the second trained predictive model using all of the sets of training records except the first set of training records.

13. The medium of claim 10, further comprising:

calculating a mean of the scores of the intermediate training records; and for each intermediate training record, reducing the score of the intermediate training record by the mean.

14. The medium of claim 10, further comprising instructions that when executed by one or more computers cause the one or more computers to perform operations comprising:

determining a high-end score for the scores of the intermediate training records;

identifying an intermediate training record having a score greater than the high-end score; and changing the score of the identified intermediate training record to be the high-end score.

15. The medium of claim 14, further comprising instructions that when executed by one or more computers cause the one or more computers to perform operations comprising:

determining a low-end value for the scores of the intermediate training records;

identifying a second intermediate training record having a score less than the low-end score; and changing the score of the identifier second intermediate training record to be the low-end score.

16. The medium of claim 10 wherein the score normalization model is configured to generate scores associated with predictive outputs wherein the scores are between zero and one, inclusive.

17. The medium of claim 10, further comprising instructions that when executed by one or more computers cause the one or more computers to perform operations comprising:

receiving a predictive request from a client device, the predictive request including input data;

generating an intermediate output by inputting the input data to the first trained predictive model;

generating a predictive output by providing the intermediate output to the score normalization model; and providing the predictive output to the client device.

18. The medium of claim 10, wherein each of the intermediate training records comprises a value for each distinct category in the initial training data.

19. A system comprising:
one or more computers and one or more storage devices storing instructions that are operable, when executed by the one or more computers, to cause the one or more computers to perform operations comprising:
receiving initial training data, the initial training data comprising initial training records, each initial training record identifying input data as input and a category as output;
generating a trained predictive model using a first subset of the initial training data and a training function;
generating intermediate training records including inputting input data of a second subset of the initial training records to the trained predictive model, each intermediate training record having a score; and
generating a score normalization model using a score normalization training function and the intermediate training records.

20. The system of claim 19 further comprising:
dividing the initial training records into sets of training records, the sets of training records including a first set of training records;
generating a second trained predictive model using at least one of the sets of training records; and
generating an intermediate training record for each initial training record in the first set of training records, each intermediate training record having a value as input and the category of a respective initial training record as output, wherein the value is generated by inputting input data of the respective initial training record into the second trained predictive model.

21. The system of claim 20, wherein generating the second trained predictive model comprises generating the second trained predictive model using all of the sets of training records except the first set of training records.

22. The system of claim 19, wherein the one or more storage devices further store instructions that are operable, when executed by the one or more computers, to cause the one or more computers to perform operations comprising:
calculating a mean of the scores of the intermediate training records; and
for each intermediate training record, reducing the score of the intermediate training record by the mean.

23. The system of claim 19, wherein the one or more storage devices further store instructions that are operable, when executed by the one or more computers, to cause the one or more computers to perform operations comprising:
determining a high-end score for the scores of the intermediate training records;
identifying an intermediate training record having a score greater than the high-end score; and
changing the score of the identified intermediate training record to be the high-end score.

24. The system of claim 23, wherein the one or more storage devices further store instructions that are operable, when executed by the one or more computers, to cause the one or more computers to perform operations comprising:
determining a low-end value for the scores of the intermediate training records;
identifying a second intermediate training record having a score less than the low-end score; and
changing the score of the identifier second intermediate training record to be the low-end score.

25. The system of claim 19 wherein the score normalization model is configured to generate scores associated with predictive outputs wherein the scores are between zero and one, inclusive.

26. The system of claim 19, wherein the one or more storage devices further store instructions that are operable, when executed by the one or more computers, to cause the one or more computers to perform operations comprising:
receiving a predictive request from a client device, the predictive request including input data;
generating an intermediate output by inputting the input data to the trained predictive model;
generating a predictive output by providing the intermediate output to the score normalization model; and
providing the predictive output to the client device.

27. The system of claim 19, wherein each of the intermediate training records comprises a value for each distinct category in the initial training data.

* * * * *

UNITED STATES PATENT AND TRADEMARK OFFICE
CERTIFICATE OF CORRECTION

| | |
|---|---|
| PATENT NO. | : 8,370,279 B1 |
| APPLICATION NO. | : 13/248474 |
| DATED | : February 5, 2013 |
| INVENTOR(S) | : Wei-Hao Lin et al. |

It is certified that error appears in the above-identified patent and that said Letters Patent is hereby corrected as shown below:

In the Claims:

Column 18
Line 1, claim 10, delete the words "the a" and insert -- the --

Signed and Sealed this
Seventh Day of May, 2013

Teresa Stanek Rea
*Acting Director of the United States Patent and Trademark Office*